United States Patent
Stoops et al.

(10) Patent No.: US 10,313,341 B2
(45) Date of Patent: *Jun. 4, 2019

(54) SYSTEM AND METHOD FOR IDENTITY AUTHENTICATION

(71) Applicant: GENESYS TELECOMMUNICATIONS LABORATORIES, INC., Daly City, CA (US)

(72) Inventors: Daniel Stoops, Powell, OH (US); James Kraeulter, Cardiff, CA (US); Cliff Bell, Kalispell, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,621

(22) Filed: Apr. 3, 2018

(65) Prior Publication Data
US 2018/0227289 A1    Aug. 9, 2018

Related U.S. Application Data

(63) Continuation of application No. 14/708,974, filed on May 11, 2015, now Pat. No. 9,961,076.

(51) Int. Cl.
*H04L 29/06* (2006.01)
*H04W 12/06* (2009.01)

(52) U.S. Cl.
CPC .......... *H04L 63/0861* (2013.01); *H04L 63/08* (2013.01); *H04L 63/083* (2013.01); *H04W 12/06* (2013.01); *H04L 2463/082* (2013.01)

(58) Field of Classification Search
CPC ....... H04L 63/10; H04L 63/20; H04L 63/083; H04L 63/0861
USPC .......................................................... 726/1
See application file for complete search history.

(56) References Cited

U.S. PATENT DOCUMENTS

| | | | |
|---|---|---|---|
| 6,704,873 B1 * | 3/2004 | Underwood | H04L 63/02 709/223 |
| 7,065,648 B1 | 6/2006 | Kamibayashi et al. | |
| 7,305,562 B1 * | 12/2007 | Bianco | H04L 63/08 709/229 |
| 7,373,395 B2 * | 5/2008 | Brailean | H04L 29/06027 709/204 |
| 7,380,120 B1 * | 5/2008 | Garcia | G06F 21/6209 713/160 |

(Continued)

FOREIGN PATENT DOCUMENTS

JP    2009230653 A    10/2009

OTHER PUBLICATIONS

Faynberg, Igor et al., On Dynamic Access Control in Web 2.0 and Beyond: Trends and Technologies, Bell Labs Technical Journal 16(2), 2011, pp. 199-218, published by Wiley Periodicals, Inc., published online in Wiley Online Library (wileyonlinelibrary.com), DOI: 10.1002/bltj.20511.

(Continued)

*Primary Examiner* — Shahriar Zarrineh

(57) ABSTRACT

A system, comprising includes an orchestration server including a processor, the orchestration server to receive authentication factors. A rules engine connects with the orchestration server, the orchestration to send the authentication factors to the rules engine and to request a decision on authentication from the rules engine. The rules engine to send the decision on authentication to the orchestration server based on the received authentication factors and a rules set.

20 Claims, 5 Drawing Sheets

(56) References Cited

U.S. PATENT DOCUMENTS

| | | | |
|---|---|---|---|
| 8,107,625 B2* | 1/2012 | Boland | G08B 13/1672 380/37 |
| 8,156,539 B1 | 4/2012 | Nelson | |
| 8,484,707 B1 | 7/2013 | Bertz et al. | |
| 8,595,810 B1 | 11/2013 | Ben Ayed | |
| 8,613,070 B1 | 12/2013 | Borzycki et al. | |
| 8,707,416 B2 | 4/2014 | Oba et al. | |
| 8,925,058 B1 | 12/2014 | Dotan et al. | |
| 9,177,126 B2 | 11/2015 | Curren | |
| 9,305,155 B1 | 4/2016 | Vo et al. | |
| 9,313,172 B1* | 4/2016 | Brandwine | H04L 63/0236 |
| 9,355,234 B1* | 5/2016 | Magi Shaashua | G06F 21/32 |
| 9,548,979 B1 | 1/2017 | Johnson et al. | |
| 10,163,105 B1* | 12/2018 | Ziraknejad | G06Q 20/40145 |
| 2003/0149891 A1 | 8/2003 | Thomsen | |
| 2003/0187657 A1 | 10/2003 | Erhart et al. | |
| 2004/0164848 A1 | 8/2004 | Hwang et al. | |
| 2005/0021982 A1 | 1/2005 | Popp et al. | |
| 2005/0071635 A1* | 3/2005 | Furuyama | G06F 21/32 713/168 |
| 2005/0097357 A1 | 5/2005 | Smith | |
| 2005/0108568 A1* | 5/2005 | Bussiere | H04L 63/1408 726/4 |
| 2005/0138421 A1* | 6/2005 | Fedronic | G06F 21/32 726/4 |
| 2005/0171914 A1* | 8/2005 | Saitoh | G06F 21/608 705/51 |
| 2005/0177724 A1* | 8/2005 | Ali | G06F 21/31 713/168 |
| 2006/0102717 A1* | 5/2006 | Wood | G06Q 10/10 235/382 |
| 2006/0282660 A1* | 12/2006 | Varghese | G06Q 20/341 713/155 |
| 2006/0294390 A1 | 12/2006 | Navratil et al. | |
| 2007/0050850 A1 | 3/2007 | Katoh et al. | |
| 2007/0199059 A1* | 8/2007 | Takehi | G06F 21/31 726/10 |
| 2008/0056161 A1 | 3/2008 | Okita et al. | |
| 2008/0109365 A1* | 5/2008 | Kulkarni | G06F 21/31 705/55 |
| 2008/0162338 A1* | 7/2008 | Samuels | G06F 21/40 705/38 |
| 2009/0037978 A1* | 2/2009 | Luque | G06F 21/32 726/2 |
| 2009/0069036 A1 | 3/2009 | Yotsumoto | |
| 2009/0119742 A1 | 5/2009 | Graziani et al. | |
| 2009/0165125 A1* | 6/2009 | Brown | G06F 21/31 726/21 |
| 2009/0172156 A1 | 7/2009 | Yadav et al. | |
| 2009/0254970 A1 | 10/2009 | Agarwal et al. | |
| 2009/0300745 A1 | 12/2009 | Dispensa | |
| 2010/0056105 A1* | 3/2010 | Erhart | G06F 21/629 455/411 |
| 2010/0063935 A1 | 3/2010 | Thomas et al. | |
| 2010/0075631 A1 | 3/2010 | Black et al. | |
| 2010/0107222 A1 | 4/2010 | Glasser | |
| 2010/0179813 A1 | 7/2010 | Summerfield et al. | |
| 2010/0242092 A1 | 9/2010 | Harris et al. | |
| 2010/0313145 A1 | 12/2010 | Dillenberger et al. | |
| 2011/0088084 A1 | 4/2011 | Yasaki et al. | |
| 2011/0106947 A1 | 5/2011 | Lin | |
| 2011/0205016 A1 | 8/2011 | Al-Azem et al. | |
| 2011/0209064 A1* | 8/2011 | Jorgensen | G06F 9/4445 715/733 |
| 2011/0296489 A1* | 12/2011 | Fernandez Alonso | H04L 63/08 726/1 |
| 2011/0314530 A1 | 12/2011 | Donaldson | |
| 2012/0084078 A1 | 4/2012 | Moganti et al. | |
| 2012/0241204 A1 | 9/2012 | Matsumoto et al. | |
| 2012/0311722 A1* | 12/2012 | Wang | H04L 63/0428 726/28 |
| 2013/0023240 A1* | 1/2013 | Weiner | H04W 12/06 455/411 |
| 2013/0065564 A1* | 3/2013 | Conner | G06K 19/0718 455/414.1 |
| 2013/0145439 A1* | 6/2013 | Lee | G06F 21/6245 726/5 |
| 2013/0225129 A1 | 8/2013 | Norbisrath et al. | |
| 2013/0232543 A1 | 9/2013 | Cheng et al. | |
| 2013/0289999 A1* | 10/2013 | Hymel | G10L 17/005 704/273 |
| 2013/0333002 A1* | 12/2013 | Belton | H04L 63/08 726/5 |
| 2013/0347060 A1* | 12/2013 | Hazzani | G06F 21/554 726/1 |
| 2014/0013405 A1 | 1/2014 | White | |
| 2014/0033290 A1 | 1/2014 | Tuchman et al. | |
| 2014/0109210 A1 | 4/2014 | Borzycki et al. | |
| 2014/0123251 A1* | 5/2014 | Takami | H04L 63/0876 726/5 |
| 2014/0172430 A1* | 6/2014 | Rutherford | G06Q 20/20 704/273 |
| 2014/0173688 A1 | 6/2014 | Fischer et al. | |
| 2014/0222995 A1* | 8/2014 | Razden | G09B 7/02 709/224 |
| 2014/0280889 A1 | 9/2014 | Nispel et al. | |
| 2014/0289833 A1 | 9/2014 | Briceno et al. | |
| 2014/0325220 A1* | 10/2014 | Tunnell | G06F 21/00 713/168 |
| 2014/0330563 A1* | 11/2014 | Faians | G06Q 30/0185 704/236 |
| 2014/0331278 A1 | 11/2014 | Tkachev | |
| 2014/0337945 A1 | 11/2014 | Jia et al. | |
| 2015/0033286 A1 | 1/2015 | Shahidzadeh et al. | |
| 2015/0033305 A1 | 1/2015 | Shear et al. | |
| 2015/0052576 A1 | 2/2015 | Togawa | |
| 2015/0059003 A1 | 2/2015 | Bouse | |
| 2015/0237031 A1* | 8/2015 | Neuman | H04L 63/08 713/176 |
| 2015/0242605 A1 | 8/2015 | Du et al. | |
| 2015/0271169 A1 | 9/2015 | Seligson et al. | |
| 2016/0036811 A1 | 2/2016 | Shim et al. | |
| 2016/0055324 A1* | 2/2016 | Agarwal | G06F 21/31 726/17 |
| 2016/0119379 A1 | 4/2016 | Nadkarni | |
| 2016/0180068 A1 | 6/2016 | Das et al. | |
| 2016/0191512 A1* | 6/2016 | Tatourian | H04L 63/0861 726/7 |
| 2016/0301779 A1 | 10/2016 | Cui et al. | |
| 2016/0359838 A1 | 12/2016 | Dasgupta et al. | |
| 2017/0250982 A1 | 8/2017 | Yang | |

OTHER PUBLICATIONS

International Search Report and Written Opinion for International Application No. PCT/US2016/031682, dated Jul. 27, 2016, 17 pages.

* cited by examiner

| Account Balance | | | | |
|---|---|---|---|---|
| | Auth=true | Auth=true | Auth=true | Auth=true |
| PIN | X | X | X | |
| Touch ID | | X | | |
| Vioce Bio | X | | | |
| Facial Recog | | | | X |
| Last 4 social | | | X | |

| Account Details | | | |
|---|---|---|---|
| | Auth=true | Auth=true | Auth=true |
| PIN | | X | |
| Touch ID | X | | |
| Vioce Bio | X | | |
| Facial Recog | | X | X |
| Last 4 social | | | X |

| Transfer Funds | | | |
|---|---|---|---|
| | Auth=true | Auth=true | Auth=true |
| PIN | | | X |
| Touch ID | X | | X |
| Vioce Bio | | X | X |
| Facial Recog | X | X | |
| Last 4 social | | | X |

SYSTEM AND METHOD FOR IDENTITY AUTHENTICATION

CROSS-REFERENCE TO RELATED APPLICATIONS:

This application is a continuation of U.S. patent application Ser. No. 14/708,974, filed on May 11, 2015, the content of which is incorporated herein by reference.

BACKGROUND

Fraud includes the act of obtaining goods or services by deception. This can involve identity fraud, including the use of stolen, forged or counterfeit documents such as a passport or driving license to fraudulently obtain goods or services. The fraudulently obtained goods or services can relate to bank accounts, mortgages, credit cards, rail products, applications for jobs, dishonest claims for state benefits, etc. There may be various ways to prevent fraud, including identity authentication.

BRIEF DESCRIPTION OF THE DRAWINGS

In association with the following detailed description, reference is made to the accompanying drawings, where like numerals in different figures can refer to the same element.

FIG. 3 is a chart illustrating an example rule set for performing authentication.

FIG. 4 is a chart illustrating an example rule set for performing authentication.

FIG. 5 is a chart illustrating an example rule set for performing authentication.

DETAILED DESCRIPTION

Systems and methods can provide for streamlining and improving authentication experiences for customers using a combination of authentication resources, e.g., on the customer's side, and contact centers, e.g., of an enterprise. Authentication resources can include mobile devices, websites, biometric resources, operational analysis systems, risk aggregation system, etc. For the sake of explanation, the protected goods or services are described in terms of financial services, but other goods and services can be used. In one example, the systems and methods are based on one or multiple types of verification or authentication from one or more vendors, and over one or more communication channels, without the need for expensive or hard to change custom solutions.

Figure 1:
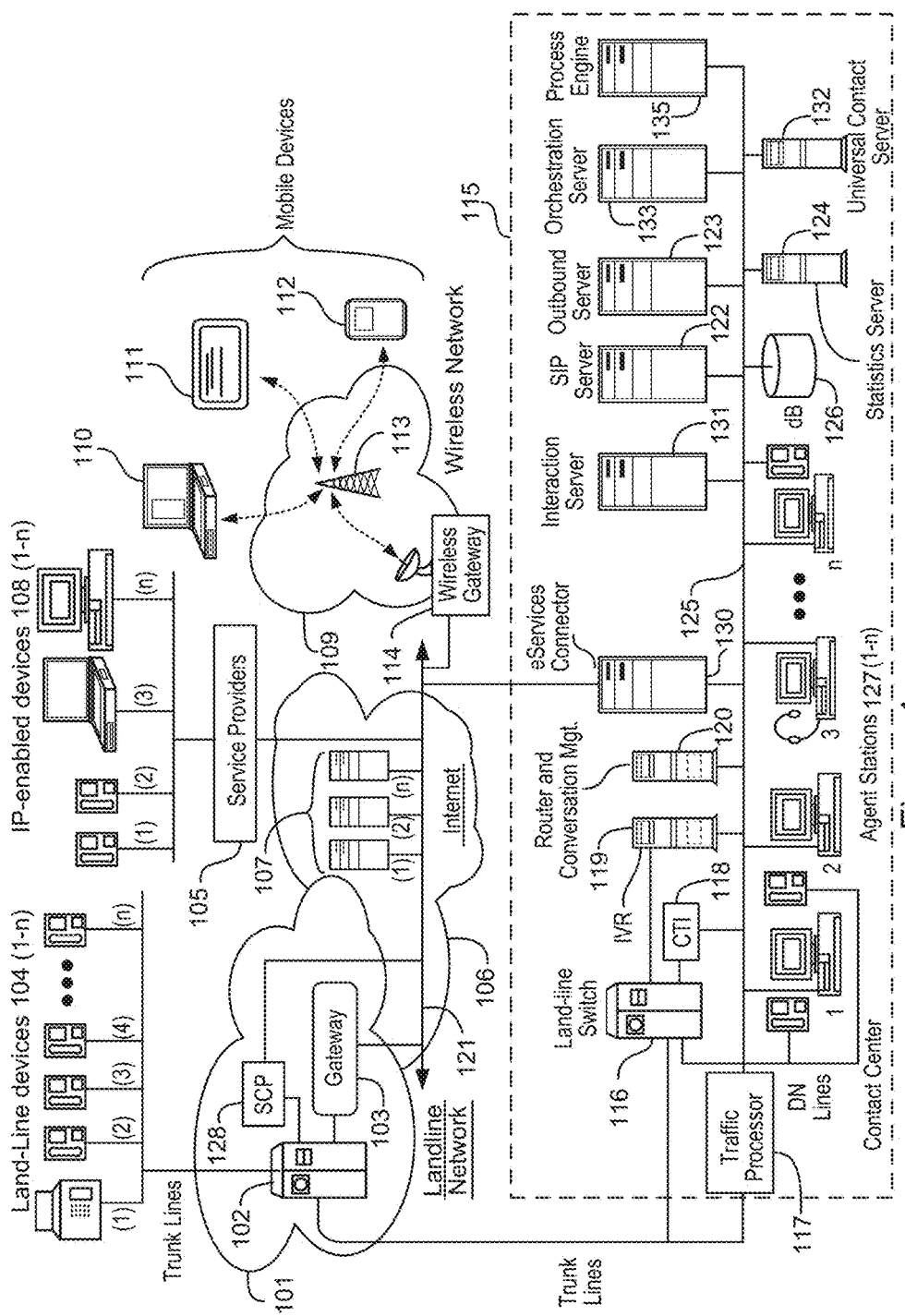
FIG. 1 is a block diagram of an exemplary architectural overview of a contact center.

FIG. 1 is a block diagram illustrating a contact center 115 and a plurality of networks with interconnections where customers may interact with agents at the contact center. Contact center 115 may be hosted by an enterprise and the enterprise may employ more than one contact center. Customers and agents may interact with contact center 115 through communication appliances such as land-line devices, e.g., telephones and facsimile machines 104 (1-n), IP-enabled devices 108 (1-n), e.g., laptop or desktop computer and IP-enabled phones, through mobile devices 110, 111 or 112, e.g., mobile phones, smart phones, personal digital assistants, tablets, etc. Interactions may include voice, text interaction, email, messaging services chat, facsimiles, mailed letters, and so on.

The orchestration server 133 can request authentication services and control authentication flows/user experience flows based on rules. The rules may include business level rules pertaining to device location, device operational state/configuration, transaction type, device capabilities on the user side, security protocols, regulations, and agent availability in the contact center at the time the interaction or transaction is being requested, etc. For example, if a last serving agent for a particular customer is available to handle the subsequent interaction, then less authentication may be acceptable for the subsequent interaction because the agent recognizes the customer.

The rules can be stored, e.g., in a database 126 connected with the orchestration server 133 via a rules engine 135. The database 126 can be located locally and/or remotely to the contact center 115, and can include one or more databases. As described in more detail below, the orchestration server 133 receives one or more types of authentication factors, e.g., PIN number, touch identification, retinal identification, facial biometrics, voice biometrics, facial recognition, social media logins, call path identification, OAuth authorization, last four digits of a social security number, called from phone number, Internet protocol (IP) address, etc. to use in authenticating identities.

The communication appliances 104, 108, 110, 111, or 112, etc., send authentication data directly and/or indirectly to the orchestration server 133, e.g., entered numbers, decisions on thumbprint recognition, decisions on voice recognition, etc. are sent to the orchestration server 133. For example, the authentication data can be processed by the communication appliances 104, 108, 110, 111, or 112, by the contact center 115, and/or by third party security vendors, enterprises, media device providers, etc., e.g., through facial recognition, thumbprint login, social media login, OAuth authentication, etc., before being sent to the orchestration server 133. In one implementation using OAuth, the "client" can be the customer, the "resource owner" can be the contact center 115 and the "authorization server" can be the orchestration server 133 orchestrated multi-factor, dynamically selected authentication.

When the customer is using multiple devices to provide authentication data, the authentication data can be combined into a single contact center session. For example, if the customer is using web as main channel and touch authentication is through the customer's mobile device 110, 111 or 112. In one example, device authentication can be used to combine the sessions. In another example, a time-sensitive code can allow the customer to cross devices for the purpose of authenticating within a single contact center session.

By acting as a state machine, the orchestration server 133 can maintain the state of all authentication methods to add and/or remove authentication vendors/channels without replacing the overall security model, and choose an effective process/combination for the environment and the needs of the business, and according to the business rules configured by the business for each transaction type. For example, if the environment of the communication appliances 104, 108, 110, 111, or 112 is noisy, the rules system may require the orchestration server 133 to use authentication data other than or in addition to voice recognition. The orchestration server 133 can provide a multi-factor authentication ecosystem and flexible when-then scenarios that can take into account communication appliances 104, 108, 110, 111, 112 capabilities, the surrounding environment, user preferences, the availability and success rate of each type of authentication in that environment and with that communication appliances 104, 108, 110, 111, 112, etc. capabilities, and availability of agents in the contact center to assist with manual authentication or to execute said transaction.

For the sake of explanation, in one example, a personal computer (PC) sends a cash advance or transfer request to the business entity and/or contact center 115 of the business entity. If the PC is located indoors and has a webcam, the rule set may instruct the orchestration server 133 can make a facial biometrics service call followed by request for a 4 or 6 digit PIN, or some other second factor. If the communication appliances 104, 108, 110, 111, 112 are not located indoors or do not have a webcam available, the rules set may determine that orchestration server 133 can offer a call back to capture voice biometrics, followed by the PIN. In one example, the interactive voice response (IVR) server 119 can be used to capture the voice authentication data. If there is no webcam available and the environment is noisy, or for some reason the voice biometric recognition fails, the rules set may indicate that the orchestration server 133 can offer a call back by an agent station 127(1-n), collect PIN data at the IVR server 119, connect to an agent for manual verification and/or use a third-party vendor, e.g., a security vendor to verify where the call is originating from using background noise information, for fraud detection while on the call. The orchestration server 133 sends obtained authentication data to the rules engine 135 as it's obtained for a determination on authentication based on the determined rules.

The example illustrates some of the many different scenarios that can cause one biometrics solution to fail, or not be viable in any case, while also showing how the call can be connected to an agent for manual verification. The orchestration server 133, along with the rules engine 135, provide for flexible when-then scenarios, combined with an approved and functioning ecosystem. A result is multi-factor identification authentication that is flexible, business rules driven, and allows goods and service providers to provide a good customer experience, by offering authentication options for the particular transaction, communication appliances 104, 108, 110, 111, 112, and environment. Flexibility can include session establishment even in case of partial authentication. The authentication level can be an attribute of the session, and depending on the level certain transactions are enabled/denied.

The orchestration server 133 and rules engine 135 can improve authentication experiences by reducing risk of authentication failure, e.g., based on the environment, and when failure occurs, enabling a priority connection to an agent for manual authentication, for example. Use of valuable agent resources can also be minimized by the orchestration server 133 attempt to resolve authentication without the need for an agent, and in the case where an agent or other live representative is required to execute the transaction, only connecting the customer to that representative after authentication, according to business rules set by the company, is completed or progresses to whatever extent possible given device capabilities, surrounding environment, etc.

In one example of a contact center 115, interactions through land-line devices 104 may connect over trunk lines as shown to a network switch 102. Switch 102 may interact with hardware and software of a Service Control Point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch.

Interactions through IP-enabled devices 108 (1-n) may occur through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108($n$) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement to interact with contact centers is through mobile devices, illustrated in FIG. 1 by devices 110, 111 and 112. Such mobile devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur in various ways, e.g., through Wi-Fi and/or individual ones of cell towers 113 associated with base stations having gateways such as gateway 114 illustrated, the gateways connected to Internet backbone 121, etc.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMINATION SYSTEMS, INC. T-server. Calls may be queued in any one of a variety of ways before connection to an agent, either locally-based or remote from the contact center, depending on circumstances.

Incoming land-line calls to switch 116 may also be connected to the IVR server 119, which may serve to ascertain purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMINATION SYSTEMS, INC. orchestration routing server, a universal routing server (URS) and conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more.

The Interaction Server 131 may leverage services of other servers in the contact center, and available remotely as well. For example, SMS and email can be processed by a universal contact server 132 which interfaces with a database to store data on contacts, e.g., customers, including customer profiles and interaction history. The customer profile can include information about a level of service that the customer's interactions are to receive, e.g., for distinguishing a customer segment (gold/silver/bronze) a particular interaction belongs to.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB may be provided to archive interaction data and to provide storage for many of the activities in contact center 115. An outbound server 123 is illustrated and may be used to manage outbound calls in the contact center 115, where calls may be made to aid the authentication process, and answered calls may be connected directly or be queued to be connected to agents involved in the outbound calls.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary.

Contact centers 115 may operate with a wide variety of media channels for interaction with customers who call in to the centers. Such channels may enable voice interaction in some instances, and in other instances text-based interaction, which may include chat sessions, email exchanges, and text messaging, etc.

Figure 2:
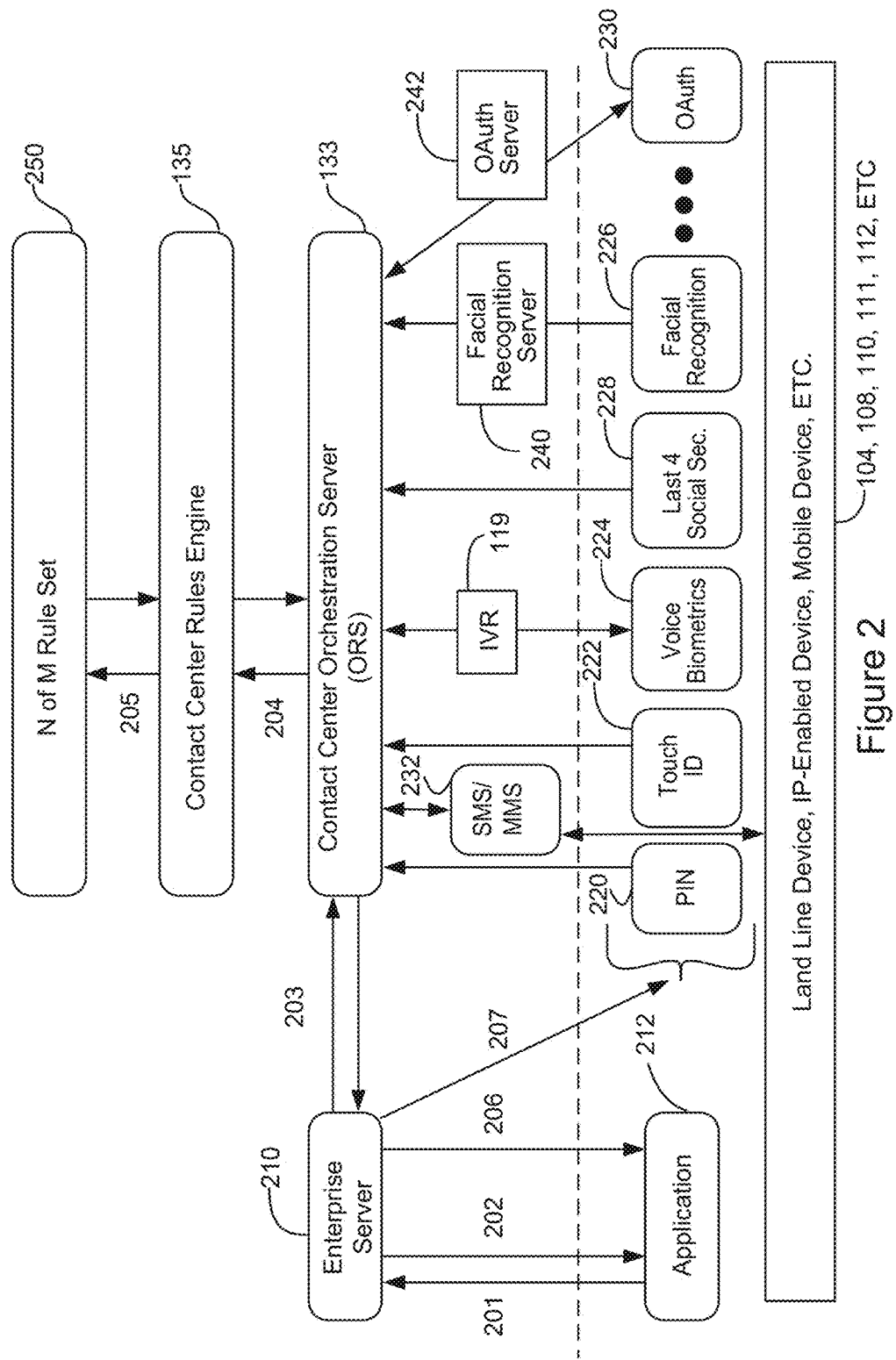
FIG. 2 is a block diagram of an exemplary architecture for authenticating an identity, e.g., using a contact center.

FIG. 2 is a block diagram of an exemplary architecture for authenticating an identity, e.g., using the contact center 115. The landline device 104, IP-enabled device 108, or mobile device 110, 111, 112, etc. makes a request for information to an enterprise server 210 (201). To interact with mobile devices 110, 111, 112, the enterprise server 210 can implement a mobile services server 700 (FIG. 7), for example GENESYS Mobile Engagement (GME) manufactured by GENESYS TELECOMMUNICATIONS LABORATORIES, INC., or other engagement server. For the sake of explanation, in this example, the enterprise is a bank but the enterprise can be any enterprise. The bank receives a request from the landline device 104, IP-enabled device 108, or mobile device 110, 111, 112, etc. for an account balance, a request for account details, a request to transfer funds, etc., together or in separate transactions. In some cases the landline device 104, IP-enabled device 108, or mobile device 110, 111, 112 can include an application 212, e.g., a mobile application or a web application, etc. that communicates with the enterprise server 210 to make the request. The mobile device 112, 111, 112 can also include a mobile engagement framework to interact with the mobile services server 700.

Before the bank acts on the request to return sensitive information, the enterprise server 210 ma authenticate an identity of the person using the landline device 104, IP-enabled device 108, or mobile device 110, 111, 112 and/or the landline device 104, IP-enabled device 108, or mobile device 110, 111, 112 itself. Before authentication, the enterprise server 210 can send non-sensitive information to the landline device 104, IP-enabled device 108, or mobile device 110, 111, 112, e.g., a message that the enterprise is working on the request and/or the enterprise server 104 can request information from the landline device 104, IP-enabled device 108, or mobile device 110, 111, 112, e.g. PIN, etc. (202). In the meantime, the enterprise server 210 can block the sensitive information from being sent to the landline device 104, IP-enabled device 108, or mobile device 110, 111, 112 until authentication is complete.

There are various ways that the contact center 115 can aid in authenticating an identity of the person requesting information. For example, the enterprise server 210 can make a request to the landline device 104, IP-enabled device 108, or mobile device 110, 111, 112 via the application 212 to enter a PIN 220, and the person enters their PIN 220 (206). The application 212 returns the entered PIN 220 to the enterprise server 210 and the enterprise server 210 determines if the PIN 220 was entered correctly, e.g., by comparing the entered PIN 220 to a database of known PINs. Additionally or alternatively, the application 212 can also return other types of information, e.g., last four social security numbers 226, etc. The enterprise server 210 sends the authentication data to the orchestration server 133 regarding whether or not the PIN 220, etc. was entered correctly (203). The orchestration server 133 can then contact the contact center rules engine 135 to determine if enough N of M factors were achieved to confirm authentication of the person (204 and 205). The orchestration server 133 can communicate the authentication decision to the enterprise server 210 (210). Based on the authentication decision, the enterprise server 210 can provide the requested sensitive information to the landline device 104, IP-enabled device 108, or mobile device 110, 111, 112, not provide the requested information to the landline device 104, IP-enabled device 108, or mobile device 110, 111, 112, ask the landline device 104, IP-enabled device 108, or mobile device 110, 111, 112 for other types of authentication data, etc., as instructed by the orchestration server 133.

In another example, the enterprise server 210 can obtain authentication data for the orchestration server 133 to consider by instructing the mobile engagement framework located on the mobile device 110, 111, 112 to invoke the touch ID 222 and/or facial recognition 240. Authentication data regarding whether touch ID 222, etc. was confirmed or not is sent to the enterprise server 210 to send to the orchestration server 133, or sent to the orchestration server 133 directly, for the orchestration server 133 to make a decision on authentication. The orchestration server 133 can determine whether authentication was achieved or not by querying the contact center rules engine 135, e.g., authentication being based on whether or not N of M rules of the N of M rule set 250 were confirmed.

In one example, a touch ID application or facial recognition server 240, etc. can return a risk score, e.g., from 1-100 or other score range. The rules engine 135 can determine based on the N or M rule set 250 that if the returned score is under a determined number, e.g., 30, the risk of an imposter is low and no additional authentication data is needed to provide authentication. If the obtained score is between 30 and 50, the orchestration server 133 can require in view of the rules engine that the PIN 220 is also needed to authenticate. For example, the score indicates that the facial recognition was poorly matched. If the obtained score is above 50, the orchestration server 133 can require that the PIN 220 and last four social security numbers 228 are needed in addition to the touch ID or facial recognition. These numbers and ranges are for example purposes and other numbers and ranges can be used. The orchestration server 133 can pass the authentication decision to the enterprise server 210 (203) and the enterprise server 210 can pass sensitive information to the person, or not, based on the authentication decision. Additionally or alternatively, the enterprise server 210 can obtain more authentication data from the landline device 104, IP-enabled device 108, or mobile device 110, 111, 112 if the orchestration sever 133 indicates to the enterprise server 210 that the additional authentication data is needed (203).

Another way to obtain authentication data is for the orchestration server 133 to request information directly from the mobile device 110, 111, 112, e.g., voice biometrics 224 from the IVR 119, an OAuth decision 230 from the Oath server 242, location information from contact center's 115 communication channel, etc. For example, stored information about a usual location of the mobile device 110, 111, 112 can be checked against the actual location to determine whether or not the locations match. If the locations match, the orchestration server 133 can use this authentication data to aid in making an authentication decision. If the locations do not match, the orchestration server 133 can require that additional authentication data be obtained, e.g., PIN 220, touch ID 222, voice biometrics 224, an OAuth decision, and/or facial recognition 226, etc.

Another way for the orchestration server 133 to obtain authentication data is via another communication channel 232, e.g., a short message service (SMS) text message or multimedia messaging service (MMS) message sent to a known telephone number the mobile device 110, 111, 112. The SMS or MMS message can include a web link for the person to click for authentication, and/or include security questions for the person to answer, etc.

In one example, the orchestration server 133 uses a hyper-text transfer protocol (HTTP) representational state transfer (REST), or other communication protocol type, call to the enterprise server 210 (FIG. 2) to make a request to retrieve authentication data. In the case of a mobile device 110, 111 or 112, the mobile device 110, 111 or 112 can send a 'yes, authenticated' data message or 'no, not authenticated' data message to the enterprise server 210, e.g., as determined by the application 212, the mobile service framework, etc. The application 212 can be a dedicated and/or plug-in to determine the authentication data. For example, the mobile device 110, 111 or 112 may access a fingerprint sensor via an application programming interface (API) to provide authentication data based on the touch identification factor. As the orchestration server 133 receives authentication data it can send the authentication data to the rules engine 135 and request authentication decisions from the rules engine 135, e.g., based on the rule set stored in the database 126.

During authentication, the enterprise server 210 can send information to the orchestration server 133, e.g., information about the type of request, received security information, e.g., PIN, etc. (203). The orchestration server 133 takes the current set of authentication factors and requests a decision about authentication from rules engine 135 (204). Authentication factors can include a PIN number 220, touch ID 222, voice biometrics 224, facial recognition 226, last four social security numbers 228, OAuth 230, etc. As described previously, the authentication factors can be sent to the orchestration server 133 directly from the landline device 104, IP-enabled device 108, or mobile device 110, 111, 112, or indirectly from an intervening processing device, e.g., the enterprise server 210, the IVR server 119, a facial recognition server 240, an OAuth server 242, etc. In some examples, the IVR 119 and/or agent 127 can initiate automated contact, e.g., callback, with the customer to augment the authentication data during the authentication process. For example, the IVR server 119 and/or agent can gather additional voice biometric data or other identifying data, conduct fraud analysis as a factor in the authentication, conduct phone line analytics, etc.

To make an authentication decision, the rules engine 135 can access the rule set 250 for the requested transaction. For example, for a requested account balance, the rules set can indicate that authentication occurs when the landline device 104, IP-enabled device 108, or mobile device 110, 111, 112 provides a correct PIN number 220 and last four social security numbers 228 (205). The rule set 250 can be updated dynamically and can vary for different situations e.g., based on the type of transaction, the enterprise, the type of industry, the country of use, the security providers available, the existence of known security threats, etc. For example, if PIN numbers have been compromised, the business rule can be easily changed to not count PIN in authentication or devalue it by half, etc., instead of having to re-write the authentication code.

If the landline device 104, IP-enabled device 108, or mobile device 110, 111, 112 is not currently authenticated, a list of missing authentication factor options can be sent to the rules engine 135. The orchestration server 133 can manage the flow of authentication factors to the rules engine 135 and responses from the rules engine 135. If the enterprise server 210 receives authentication from the orchestration server 133, then the requested data is returned to the landline device 104, IP-enabled device 108, or mobile device 110, 111, 112 (206). If the orchestration server 133 indicates that further authentication factors are needed, then the enterprise server 210 can query the landline device 104, IP-enabled device 108, or mobile device 110, 111, 112 for additional factors (207). Additionally or alternatively, the orchestration server 133 can leverage previous authentication for subsequent interactions, e.g., if an authentication token still valid, only partial refresh is needed. Therefore, the orchestration server 133 can connect multiple authentication channels, enterprises, and authentication rules together for parallel type processing. An agent station 127 (1-n) of the contact center 115 need not to become involved during much or any of this process, which can save agent resources. In such cases the universal contact server 132 can become involved when session history is captured. For example, the universal contact server 132 can capture authentication details associated with a given session.

FIGS. 3-5 are charts illustrating example rule sets 250 for performing authentication. There are M authentication factors, in this example PIN, touch ID, voice biometrics, facial recognition, called from phone number, IP address, and last four social security numbers, etc. More or less authentication factors can be used depending on an implementation. For example, OAuth, birthdate, mother's maiden name, etc. and other authentication factors can also be used. Depending on an implementation, at least N number of factors must be met before the rules engine 135 approves authentication. In a bank example, N=1 to 2 for account balance (FIG. 3), N=2 for account details (FIG. 4), and N=2 to 4 for a transfer of funds (FIG. 5). Other variations of the N's can be used. N can vary by type of authentication factor. For example, the request for account balance information can be authorized upon at least facial recognition, or upon at least PIN and an additional factor, e.g., voice biometrics, touch ID or the last for numbers of the social security number (FIG. 3). A transfer of funds may be authorized upon at least facial recognition and touch ID or voice biometric authentication, or upon PIN, touch ID, voice biometrics and the last four numbers of the social security number (FIG. 5).

Other examples include different variations of N and/or M. For example, N and/or M can change based on varying levels of fund transfers, e.g., to withdraw $5,000 or less, between $5,001 and $15,000, over $15,000, etc. For example, N, the minimum number of met authentication factors, out of M choices, can include as the amount increases. The orchestration server 133 can illustrate a strength of the N of M authentication, e.g., using colors red, yellow, green, etc. from weakest to strongest. The strength of the authentication can also relate to the level of funds that can be obtained/transferred.

Figure 6:
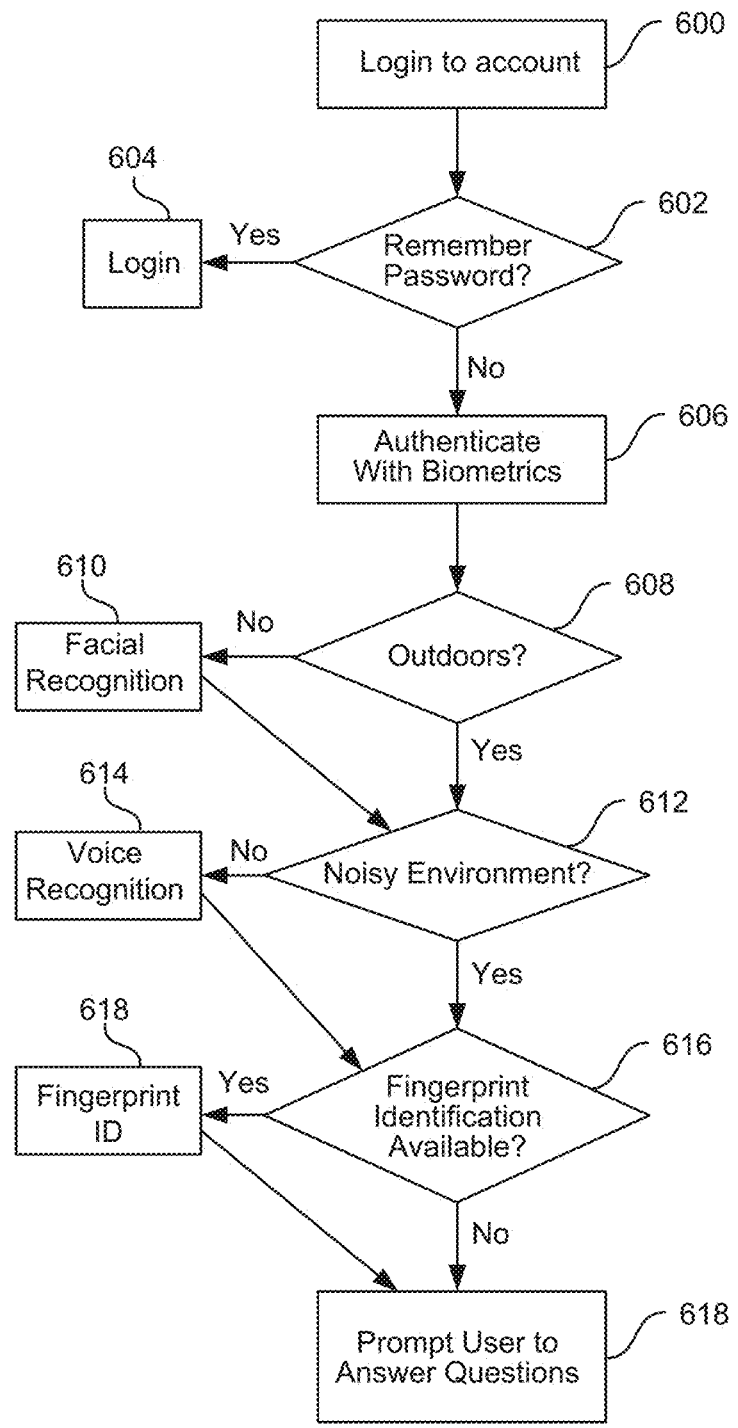
FIG. 6 is a flowchart of an example process flow for an authentication.

FIG. 6 is a flowchart of an example process flow for an authentication. As an example, a user is on a banks website and wants to login to their account to perform a banking action (600). The bank's enterprise server request a password (602). If the user remembers the password the login occurs (604). If the user forgets their password, instead of going through a password reset process or utilizing agent resources by calling the call center, the customer has the option of authenticating via biometrics (606). In one case the user is logging in to the bank on an IP enabled device 108, e.g., a desktop or laptop computer. If the orchestration server 133 determines that the user is indoors, then facial recognition may be an authentication option. The orchestration server 133 determines if the IP-enabled device 108, or mobile device 110, 111 is located outdoors and in the sunlight (608). For example, the orchestration server 133 can query the IP-enabled device 108 or mobile device 110, 111, 112 to determine its environment, e.g., indoors or outdoors. The IP-enabled device 108 or mobile device 110, 111, 112 can send environment data to the orchestration server 133 when queried, periodically, etc. The camera, microphone and any other peripherals of the landline device 104, IP-enabled device 108, or mobile device 110, 111, 112, along with any on-board data, remote data, contact center data, etc. can be used to determine the environment and/or functionality of the landline device 104, IP-enabled device 108, or mobile device 110, 111, 112.

If the IP-enabled device 108 or mobile device 110, 111, 112 is located indoors, facial recognition may be an option (610), otherwise facial recognition may not be an option (612). If facial recognition is an option, the orchestration server 133 can request the IP-enabled device 108 or mobile device 110, 111, 112 to provide a facial recognition authentication factor, e.g., whether or not facial recognition is confirmed by the IP-enabled device 108 or mobile device 110, 111, 112. An intervening device, e.g., the facial recognition server 240 (FIG. 2), can aid in or provide the determination of facial recognition.

Additionally or alternatively, the orchestration server 133 can determine if the environment is noisy (612), e.g., by querying the IP-enabled device 108 or mobile device 110, 111, 112. If the environment is not noisy, voice recognition biometrics may be a suitable option for an authentication factor (614). In the event that the orchestration server 133 determines that voice biometrics or facial recognition are not options due to either environmental situations or device capabilities, the orchestration server 133 can determine that the IP-enabled device 108, or mobile device 110, 111 may have at its disposal fingerprint identification (616). The orchestration server 133 may determine, for example, that a smart phone with a fingerprint application is available to the user to obtain a fingerprint authentication factor, for example (616). Additionally or alternatively, a third-party application may be able to authenticate a photo of the fingerprint for example. Additionally or alternatively, the orchestration server 133 can prompt the user to answer questions, e.g. by entering or saying a PIN number, by entering or saying a name, etc. (618). The orchestration server 133 can request some or all of these authentication factors, or additional authentication factors, in a determined or random order, e.g., based on the rule set.

The orchestration server 133 can invoke any of the services or prompt the user asking them questions to qualify which biometric authentication resource fits at that moment. Based on the user's response, the orchestration server 133 invokes the right resource and waits for a response, e.g., from a third-party biometric authentication service. The orchestration server 133 can wait until authentication is successfully completed via either a single third-party authentication service or any combination of multifactor authentication as required by the rules set 250 set up by the bank. Other scenarios can exist. For example, if authentication is partially passed a limited set of access rights can be granted instead of the full rights. In one example, the rules engine 135 can send scores to the orchestration server 133, e.g., 94/100, as authentication factors are processed in view of the rule set. If the score is too low to receive full rights, the orchestration server 133 can request information regarding other authentication factors, e.g., based on the rules 250, provide a lower level of rights than the full rights, route the call to an agent, etc. The available rights can be displayed to the landline device 104, IP-enabled device 108, or mobile device 110, 111, 112, etc., e.g., via a web channel, a voice channel or both. The rules can be determined by the enterprise, by law, by the contact center 115, and/or by other entities, etc. The determined business rules for a given interaction are not always free to choose by the enterprise, etc.

When authentication has been completed successfully, the orchestration server 133 can allow the IP-enabled device 108, or mobile device 110, 111 to complete the transaction in a self-service mode logging them in, resetting the password etc., and/or pass the user to an agent. For example, if the customer forgot the password, e.g. tried and it was wrong, then successfully authenticated during N of M authentication, the contact center 115 can consider this as an implicit password reset request and send the new password, e.g., after querying the customer. This can result in more efficient use of agents and other resources of the contact center 115 in general. Because the orchestration server 133 can wait on multiple authentication threads and take action when a scoring threshold is crossed, it is uniquely positioned to be the best place to do N of M authentication. The orchestration server 133 delivers a state engine, capable of maintaining and joining session data from one or more devices, and completed over a defined period of tie together for a single view of a customer conversation spanning multiple devices. For example, the customer logs in via a password in the contact center website, and the contact center sends a secret PIN via SMS to customer's mobile device 110, 111, 112. The customer enters PIN in web site. The customer logs into the contact center web via the password, and the website asks the mobile device 110, 111, 112 to send a thumb authentication request to the mobile device 110, 111, 112, and attaches a success result to web session.

Figure 7:
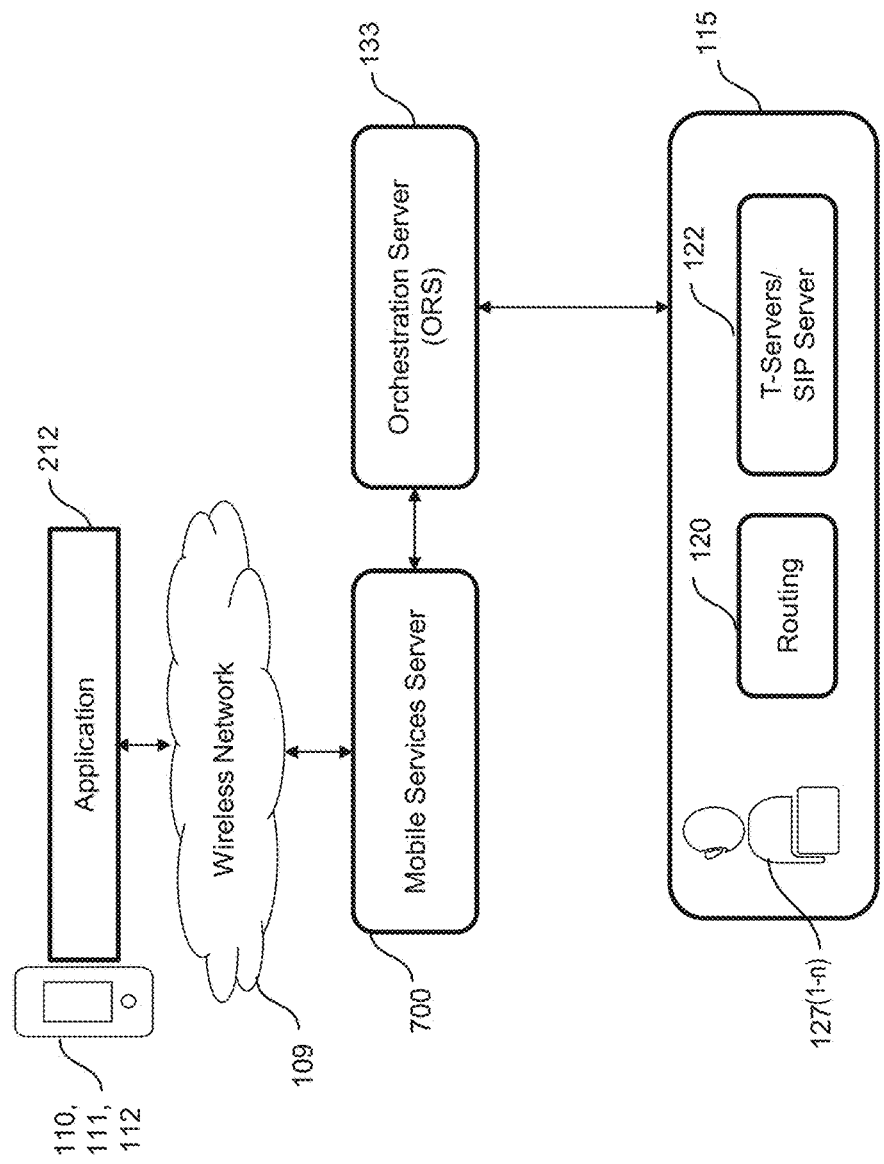
FIG. 7 is a block diagram of an example architecture for the mobile services server.

FIG. 7 is a block diagram of an example architecture for the mobile services server 700. The orchestration server 133 can connect to the mobile device 110, 111, 112 over the wireless network 109, e.g., Internet, via the mobile services server 700. In one example, the mobile services server 700 can control mobile engagement with the application 212 of the mobile device 110, 111, 112 via REST API's. The mobile services server 700 can include memory to temporally store session data including key/value pairs of strings or binary objects, and high availability (HA) shared storage that can utilize an embedded version of Cassandra, or other distributed database, e.g., over the cloud. A notification module of the mobile services server 700 can manage native push message to the mobile device 110, 111, 112. An orchestration server interface module can provide an internal interface to the orchestration server 133. With this architecture, the application 212 can perform authentication functions, e.g., touch ID 222, and pass the result to the mobile services server 700, from where the authentication can be passed to orchestration server 133.

The contact center 15 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A system, comprising:
a switch configured to receive a plurality of communications for routing to one or more contact center resources;
a processor coupled to the switch; and
a memory coupled to the processor, wherein the memory stores instructions that, when executed by the processor, cause the processor to:
access a rule set and receive, at an orchestration server operating as part of a contact center system, a first set of authentication factors, from a source, based on the rule set;
request a first decision on authentication from a rules engine based on the first set of authentication factors and the rule set;
receive, by the orchestration server, the first decision on authentication based on the received first set of authentication factors and a rules set;
update the rule set, by the orchestration server, based on the first decision on authentication to generate an updated rule set;
receive, at the orchestration server, a second set of authentication factors based on the updated rule set;
transmit, to the rules engine from the orchestration server, the second set of authentication factors and request a second decision on authentication from the rules engine based on the second set of authentication factors and the updated rule set;
receive, by the orchestration server, the second decision on authentication based on the second set of authentication factors and the updated rules set;
determine facial and voice authentication is not possible based on background noise or camera capabilities of a device operated by a user;
transmit a signal to the device operated by the user to offer a connection with a contact center agent station;
transmit a signal to the switch for routing a communication between the device operated by the user and a contact center agent station based on the first and second decisions on authentication and the determination that the facial and voice authentication is not possible; and
receive a signal from the contact center agent station or a third party indicating a verification of where the communication is originating from based on background noise information for fraud detection during the communication.

2. The system of claim 1, where the authentication factors include at least one of a PIN, a touch identification, a voice biometric, a facial recognition, a social security number, and OAuth decision.

3. The system of claim 1, wherein the instructions further cause the processor to receive the authentication factors from at least one of a mobile device and an enterprise server.

4. The system of claim 1, wherein the instructions further cause the processor to receive, from an interactive voice response server, a voice biometric authentication factor.

5. The system of claim 4, wherein the instructions further cause the processor to initiate automated contact to obtain additional authentication factors.

6. The system of claim 1, wherein the instructions further cause the processor to transmit an authentication signal to an agent station, where the agent station is not involved during the authentication.

7. The system of claim 1, where authentication comprises a minimum number N of authentication factors out of M available choices being met.

8. The system of claim 1, where the decision on authentication is displayed as a score.

9. The system of claim 1, wherein the instructions further cause the processor to grant a limited right if the authentication is partially passed.

10. A method, comprising:
receiving, by a processor, a first authentication factor from a first source based on a rule set;
receiving, by the processor, a second authentication factor from a second source;
requesting, by the processor, a first decision on authentication based on the first authentication factor and the second authentication factor;
updating, by the processor, the rule set based on the first decision on authentication to generate an updated rule set;
receiving, by the processor, an updated authentication factor from the first source based on the updated rule set;
receiving, by the processor from an interactive voice response server, a voice biometric authentication factor;
receiving, by the processor, an updated authentication factor from the second source based on the updated rule set;

requesting, by the processor, a second decision on authentication based on the updated authentication factors from the first and second sources;

providing, by the processor, an access right based on the first and second decisions on authentication;

determining, by the processor, facial and voice authentication is not possible based on background noise or camera capabilities of a device operated by a user;

transmitting, by the processor, a signal to the device operated by the user to offer a connection with a contact center agent station;

transmitting, by the processor, a signal to a switch for routing a communication between the device operated by the user and a contact center agent station based on the first and second decisions on authentication and the access right and the determination that the facial and voice authentication is not possible; and receiving, by the processor, a signal from the contact center agent station or a third party indicating a verification of where the communication is originating from based on background noise information for fraud detection during the communication.

11. The method of claim 10, where the first authentication factor and the second authentication factor include at least one of a PIN, a touch identification, a voice biometric, a facial recognition, a social security number, and OAuth decision.

12. The method of claim 10, further comprising:
determining, by the processor, whether or not an environment of the first source is outdoors, and
in response to determining the environment of the first source is not outdoors, requesting, by the processor, a facial recognition authentication factor.

13. The method of claim 10, further comprising
determining, by the processor whether or not an environment of the first source is noisy; and
in response to determining the environment of the first source is not noisy, requesting, by the processor, a voice biometric authentication factor.

14. The method of claim 10, further comprising:
determining, by the processor, whether or not the first source provides fingerprint identification, and
in response to determining the first source provides fingerprint identification, requesting, by the processor, a fingerprint identification authentication factor.

15. The method of claim 10, where an agent station is not involved during the authentication.

16. The method of claim 10, where authentication comprises meeting a minimum number N of authentication factors out of M choices.

17. The method of claim 10, further comprising displaying, by the processor, the decision on authentication as a score.

18. The method of claim 10, further comprising granting, by the processor, a limited right if the authentication is partially passed.

19. A contact center, comprising:
a switch configured to receive a plurality of communications for routing to one or more contact center resources;
a processor coupled to the switch; and
a memory coupled to the processor, wherein the memory stores instructions that, when executed by the processor, cause the processor to:
access a rule set and receive, at an orchestration server, a first set of authentication factors based on the rule set, wherein the first set of authentication factors comprises a voice biometric authentication factor from an interactive voice response server;
transmit, to a rules engine, the first set of authentication factors and request a first decision on authentication from the rules engine;
receive, from the rules engine, the first decision on authentication based on the received first set of authentication factors and the rules set;
update the rule set, by the orchestration server, based on the first decision on authentication to generate an updated rule set;
receive, from the interactive voice response server, a voice biometric authentication factor;
receive, at the orchestration server, a second set of authentication factors based on the updated rule set wherein the second set of authentication factors comprises of the voice biometric authentication factor;
receive, by the orchestration server, a second decision on authentication to the orchestration server based on the second set of authentication factors and the updated rules set;
determine facial and voice authentication is not possible based on background noise or camera capabilities of a device operated by a user;
transmit a signal to the device operated by the user to offer a connection with a contact center agent station;
transmit a signal to the switch for routing a communication between the device operated by the user and a contact center agent station based on the first and second decisions on authentication and the determination that the facial and voice authentication is not possible; and
receive a signal from the contact center agent station or a third party indicating a verification of where the communication is originating from based on background noise information for fraud detection during the communication.

20. The contact center of claim 19, where the authentication factors include at least two of a PIN, a touch identification, a voice biometric, a facial recognition, a social security number, and OAuth decision.

* * * * *